United States Patent [19]
Kano et al.

[11] Patent Number: 5,905,604
[45] Date of Patent: May 18, 1999

[54] CASSETTE TRANSFER MECHANISM FOR USE IN CASSETTE LIBRARY SYSTEM

[75] Inventors: Yasuaki Kano; Yoshitsugu Taki; Toshiya Kurokawa; Taketoshi Yamagishi; Kyoichi Isomura; Shin Kimura, all of Kanagawa, Japan

[73] Assignee: Sony Corporation, Tokyo, Japan

[21] Appl. No.: 08/907,930

[22] Filed: Aug. 11, 1997

[30] Foreign Application Priority Data

Aug. 12, 1996 [JP] Japan .................................. 8-227374

[51] Int. Cl.[6] .................................................. G11B 15/68
[52] U.S. Cl. .................................................................. 360/92
[58] Field of Search .............. 360/92, 132, 98.04–98.06; 369/36–38, 192

[56] References Cited

U.S. PATENT DOCUMENTS 5,764,457  6/1998  Uhde et al. ............................. 360/132

*Primary Examiner*—Robert S. Tupper
*Attorney, Agent, or Firm*—Jay H. Maioli

[57] ABSTRACT

A cassette transfer mechanism for transferring a cassette recording medium to and from a cassette accommodating portion for accommodating cassette recording mediums, the cassette transfer mechanism having a unit which stores information in a memory included in the cassette and/or reads information from the same and which has a connector structured to be brought into contact with a memory terminal provided for the cassette recording medium when information is stored in the memory and/or read from the same. The above-mentioned structure enables information to be stored in the memory included in the cassette and/or read from the same without a necessity of loading the cassette recording medium into a drive unit whenever information is stored/read.

6 Claims, 15 Drawing Sheets

CASSETTE TRANSFER MECHANISM FOR USE IN CASSETTE LIBRARY SYSTEM

BACKGROUND OF THE INVENTION

1. Field of the Invention

The present invention relates to a cassette transfer mechanism, and more particularly to a method which is for storing data in a memory included in a cassette and/or reading data from the same without a necessity of loading the cassette recording medium into a drive unit whenever data is stored or read.

2. Description of Related Art

A portion of cassette recording mediums each accommodating a recording medium includes a type having a memory including a semiconductor device whereby storing a variety of information, for example, date of manufacture, a manufacturing plant, title of information stored in the recording medium, name of the file, specifications of the recording medium, state of use, the position of a stored information signal in the recording medium and the contents of the information signal.

The cassette recording medium including a memory of the foregoing type can be used, for example, in a cassette library system for accommodating a multiplicity of cassette recording mediums in an accommodating rack thereof in such a manner that a required cassette recording medium can be ejected from the accommodating rack.

Hitherto, information has been stored in and/or read from a cassette recording medium including a memory of the foregoing type such that a storing and/or reading unit for storing information in the memory and/or reading information from the same is provided in the inside portion of the drive; and information is stored in the memory and/or read from the same.

When information is stored in the memory of the above-mentioned cassette library system or read from the same, the cassette recording medium must therefore be loaded into the drive whenever a storing or reading operation is performed. As a result, the simple operation for confirming the contents of the memory included in the cassette recording medium must be performed by loading the cassette recording medium into the drive whenever information is stored or read. Therefore, there arises a problem in that time is wasted.

SUMMARY OF THE INVENTION

Accordingly, an object of the present invention is to enable information to be stored in a memory included in a cassette and/or read from the same without a necessity of loading the cassette recording medium into a drive whenever information is stored/read.

According to one aspect of the present invention, there is provided an apparatus including: an accommodating portion for accommodating cassettes; a drive into which the cassette is loaded so that an information signal is stored in a recording medium included in the cassette and/or read from the same; and a transfer mechanism which moves between the accommodating portion and the drive so as to transfer the cassette to and from the accommodating portion and the drive, wherein the transfer mechanism has memory access means for storing information in the memory included in the cassette or reading information from the memory.

Therefore, the cassette transfer mechanism according to the present invention enables information to be stored in the memory included in the cassette and/or read from the same when the cassette recording medium has been received.

Other objects, features and advantages of the invention will be evident from the following detailed description of the preferred embodiments described in conjunction with the attached drawings.

DETAILED DESCRIPTION OF PREFERRED EMBODIMENTS

An embodiment of a cassette transfer mechanism according to the present invention will now be described with reference to the drawings.

Note that the following embodiment has a structure in which the present invention is applied as a cassette transfer mechanism for use in a cassette library system.

Initially, the schematic structure of the cassette library system will be described with reference to FIG. 1.

Figure 1:
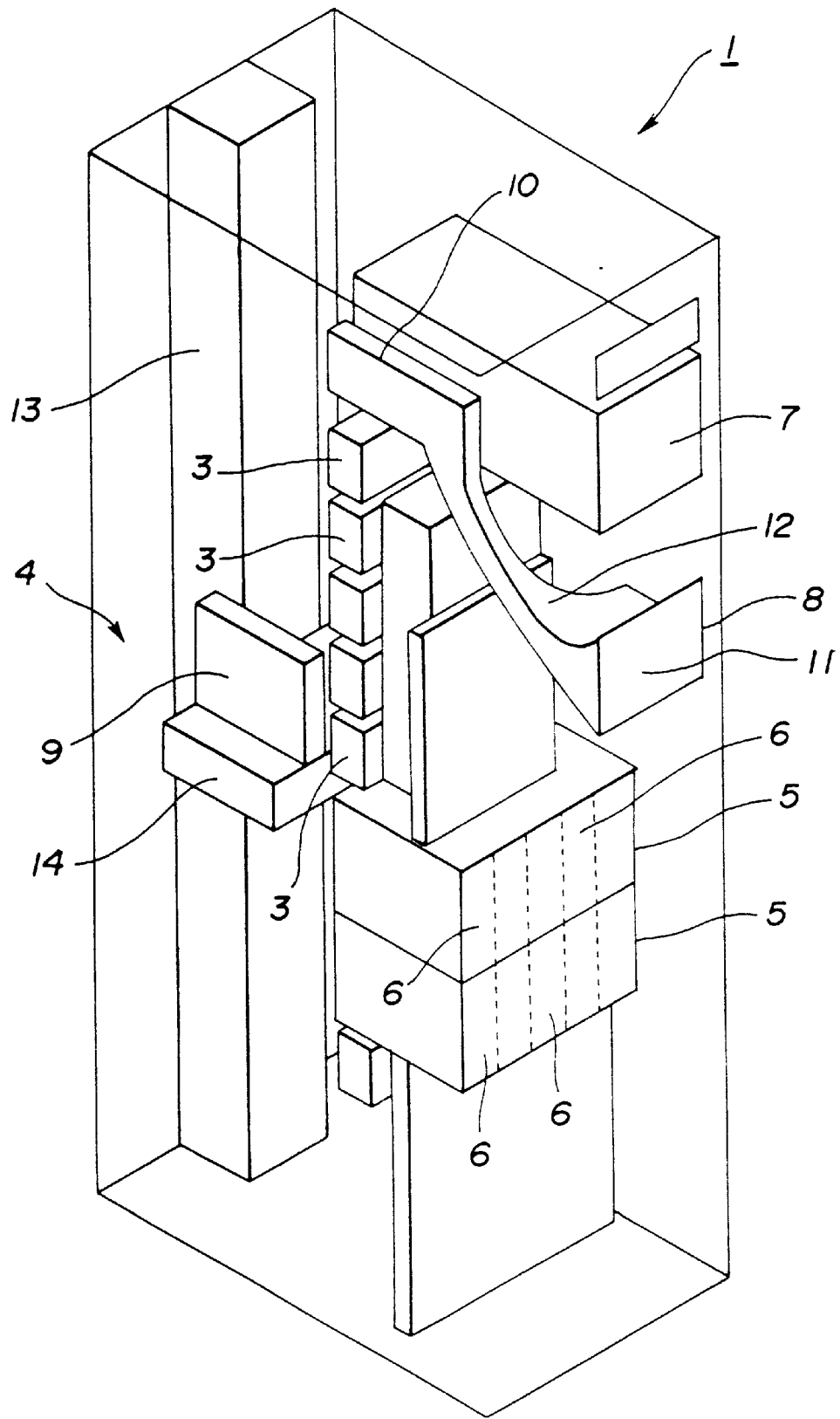
FIG. 1 is a schematic perspective view showing a cassette library system to which a cassette transfer mechanism according to the present invention is applied.

A cassette library system 1 shown in FIG. 1 is structured in such a manner that a multiplicity of tape cassettes 2 each having a magnetic tape having a width of 8 mm are accommodated in a plurality of accommodating racks 3. Moreover, a conveyance mechanism 4 capable of vertically, laterally and back and forth moving the tape cassette 2 takes out a required tape cassette 2 from the accommodating rack 3 and loads it into one of a plurality of tape streamer drives 6 provided for the tape drive portions 5 so that data is read from the tape cassette 2 and/or stored in the same. The cassette library system 1 having the above-mentioned structure is suitable for use in, for example, a system for using medical data or a VOD (Video On Demand) system.

The tape cassette 2 accommodates a magnetic tape (not shown) and includes a nonvolatile memory 2a. Moreover, a memory terminal 2b connected to the nonvolatile memory 2a is disposed on the rear side of the frame of the tape cassette 2. A variety of information items about the tape cassette 2, for example, date of manufacture, a manufacturing plant, title of information stored in the recording medium, name of the file, specifications of the recording medium, state of use, the position of a stored information signal in the recording medium and the contents of the information signal stored in the nonvolatile memory 2a.

In addition to the above-mentioned elements, the cassette library system 1 is provided with an import 7 and an outport 8. The tape cassette 2 inserted through the front surface of the import 7 is moved rearwards, and then the tape cassette 2 is taken out by a cassette transfer mechanism 9 of the conveyance mechanism 4 so that the tape cassette 2 is accommodated in one of the accommodating racks 3. The outport 8 has a receiving portion 10, a discharge portion 11 and a chute 12 for establishing the connection between the receiving portion 10 and the discharge portion 11. Therefore, an unnecessary tape cassette 2 is, by the cassette transfer mechanism 9, taken out from the accommodating rack 3 so as to be transferred to the receiving portion 10. The tape cassette 2 transferred to the receiving portion 10 is allowed to pass through the chute 12 and then reach the discharge portion 11 so that the tape cassette 2 is discharged to the outside.

The conveyance mechanism 4 is provided with a vertical movement mechanism 13 and a lateral movement mechanism 14. The lateral movement mechanism 14 laterally moves the cassette transfer mechanism 9, while the vertical movement mechanism 13 vertically moves the lateral movement mechanism 14.

Note that directions in this specification are determined such that a direction toward the lower left position in FIG. 1 is made to be "left", a direction toward the upper right position is made to be "right", a direction toward the lower right position is made to be "front", a direction toward the upper left position is made to be "rear", a direction toward the upper position is made to be "upward" and a direction toward the lower position is made to be "downward".

Figure 2:
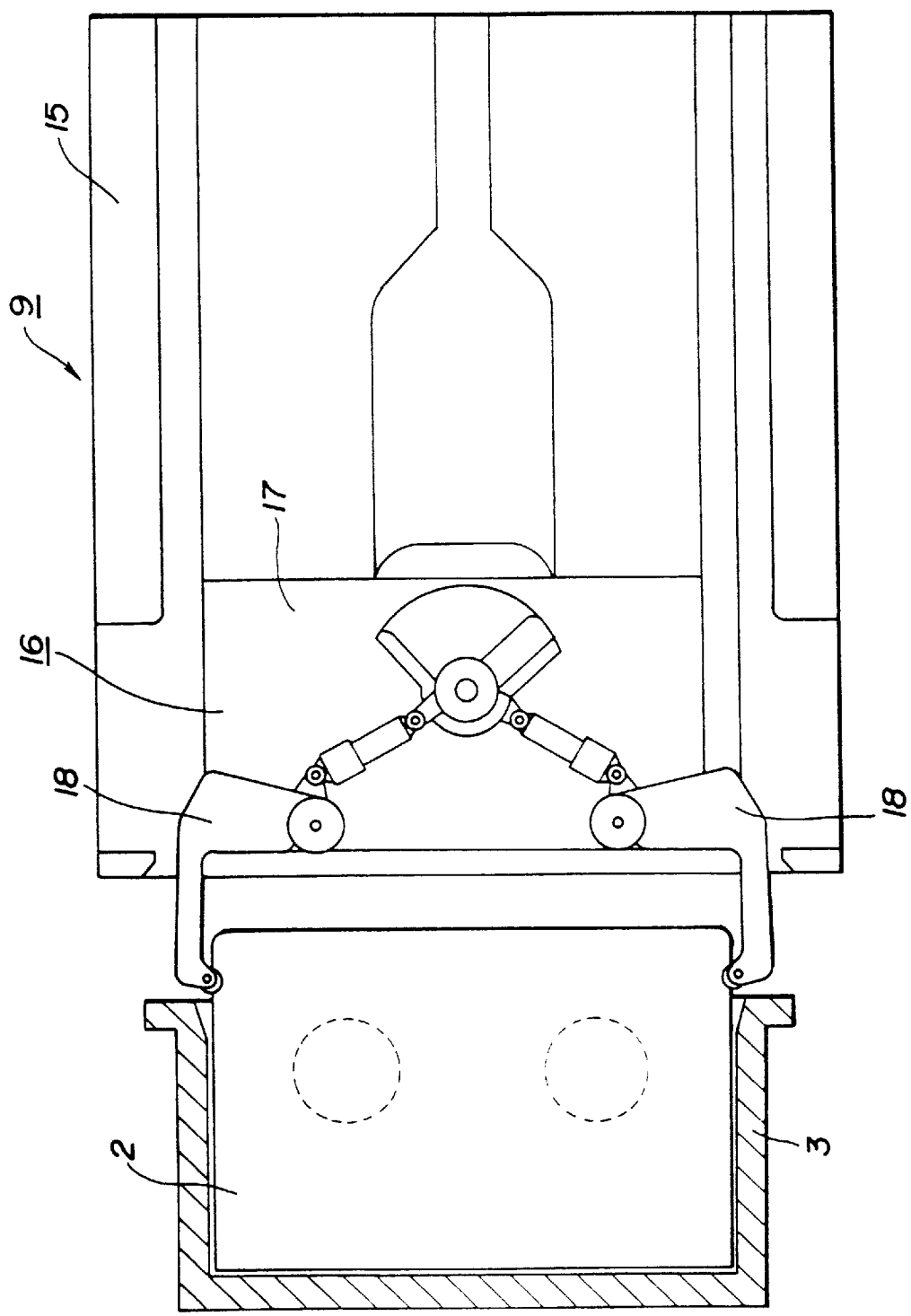
FIG. 2 is a schematic right-hand side view showing an operation for taking out the tape cassette from an accommodating rack by a handling portion in a state where hand arms have held a tape cassette accommodated in an accommodating rack.
Figure 3:
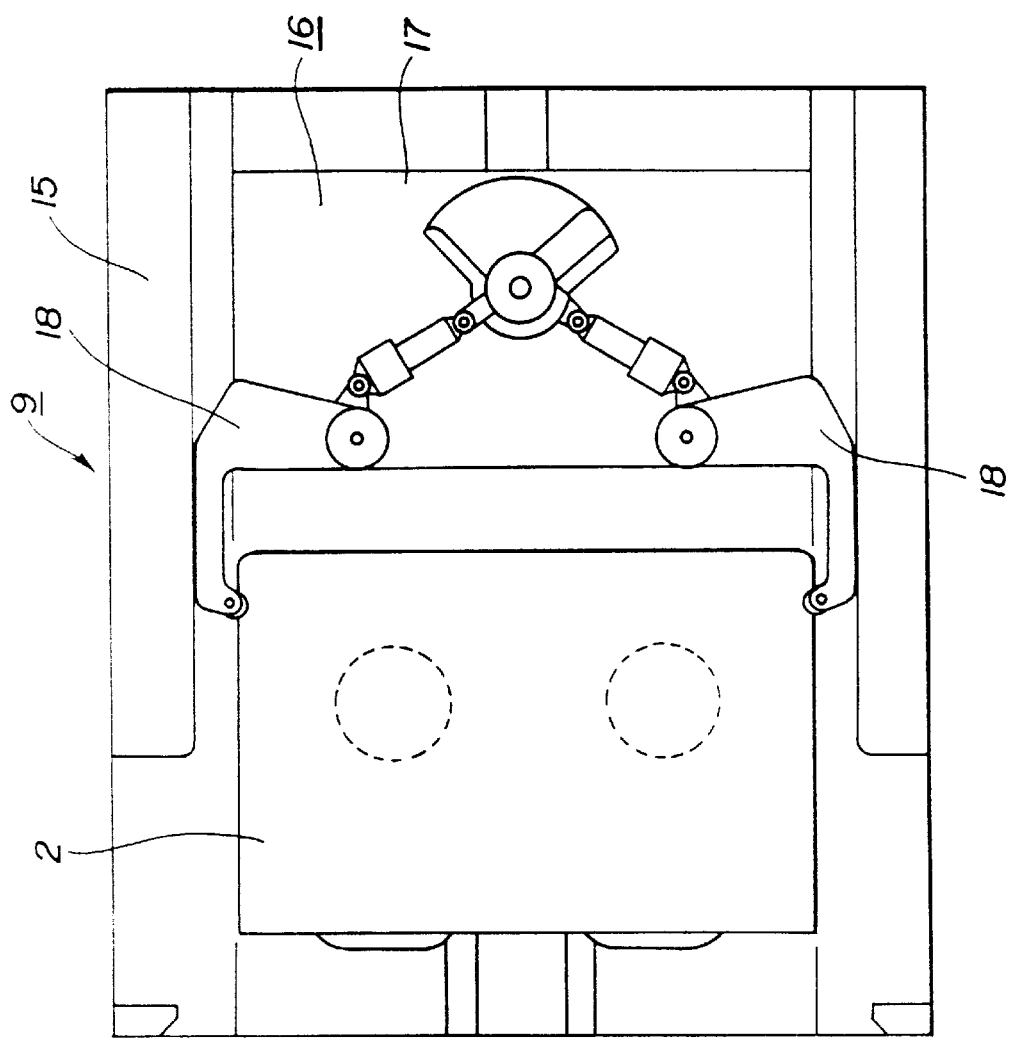
FIG. 3 is a diagram showing a state where the handling portion has been moved rearwards and the tape cassette has been introduced into a predetermined position.
Figure 3:
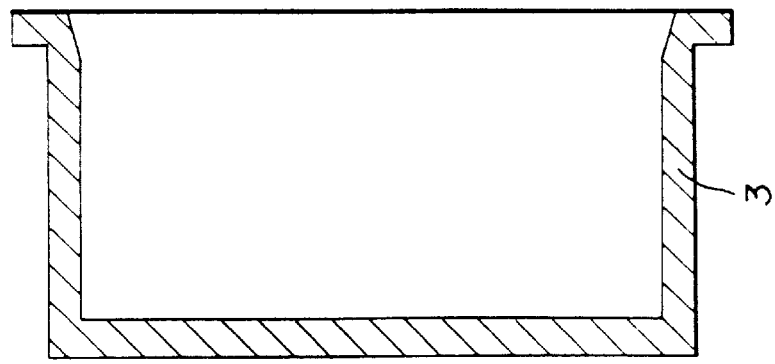
Figure 4:
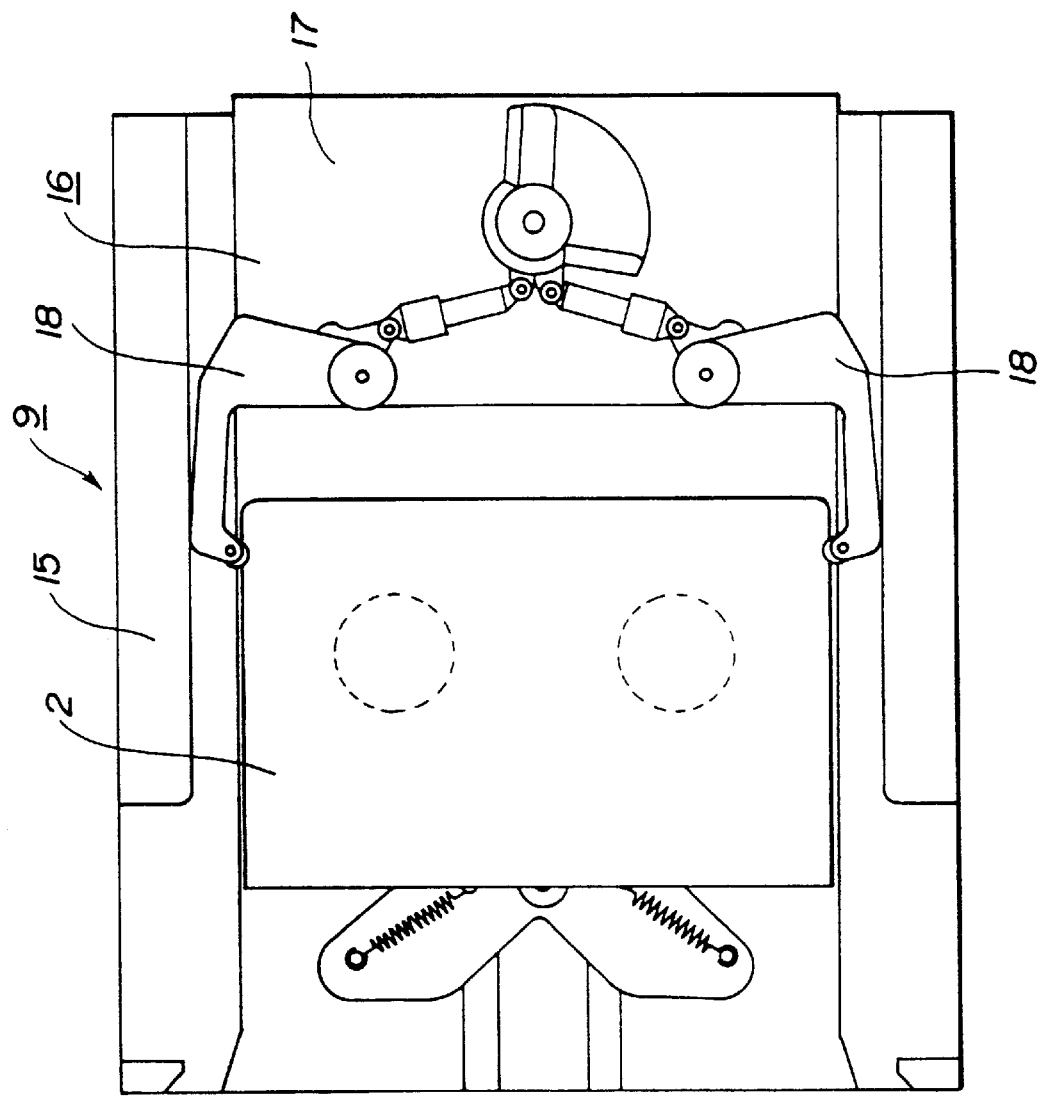
FIG. 4 is a diagram showing a state in which the handling portion has been furthermore moved rearwards from the predetermined position and reached the rear end of the movable range.

As shown in FIGS. 2 to 4, the cassette transfer mechanism 9 has a movable base 15. The movable base 15 is supported by the lateral movement mechanism 14 in such a manner that the movable base 15 is able to move in the lateral direction. Thus, the movable base 15 is moved laterally. A handling portion 16 is disposed on one of the surfaces of the movable base 15, that is, the right side surface in such a manner that the handling portion 16 is able to move back and forth by a drive portion (not shown).

The handling portion 16 has an arm base 17 which is back and forth movably supported by the movable base 15. Two hand arms 18 are rotatively supported by the arm base 17.

When a tape cassette 2 accommodated in, for example, the accommodating rack 3 is taken out, the handling portion 16 is moved forwards. Then, the leading ends of the hand arms 18 hold a portion of the tape cassette 2 slightly projecting over the accommodating rack 3 (see FIG. 2). Then, the handling portion 16 is moved rearwards (see FIG. 3). Thus, the tape cassette 2 is taken out. FIG. 3 shows a state where the tape cassette 2 has been received. In this state, the cassette transfer mechanism 9 is moved to a required position by the vertical movement mechanism 13 and the lateral movement mechanism 14. When the tape cassette 2 is returned to the accommodating rack 3, an operation contrary to the above-mentioned process is performed. Note that transfer of the tape cassette 2 is, as described above, performed to and from the tape streamer drives 6, the import 7 and the receiving portion 10 of the outport 8 as well as the accommodating racks 3. The position of the tape cassette 2 shown in FIG. 4 is a position at which a memory storing/reading unit 20, to be described later, stores information in the nonvolatile memory 2a and/or read information from the same.

Figure 5:
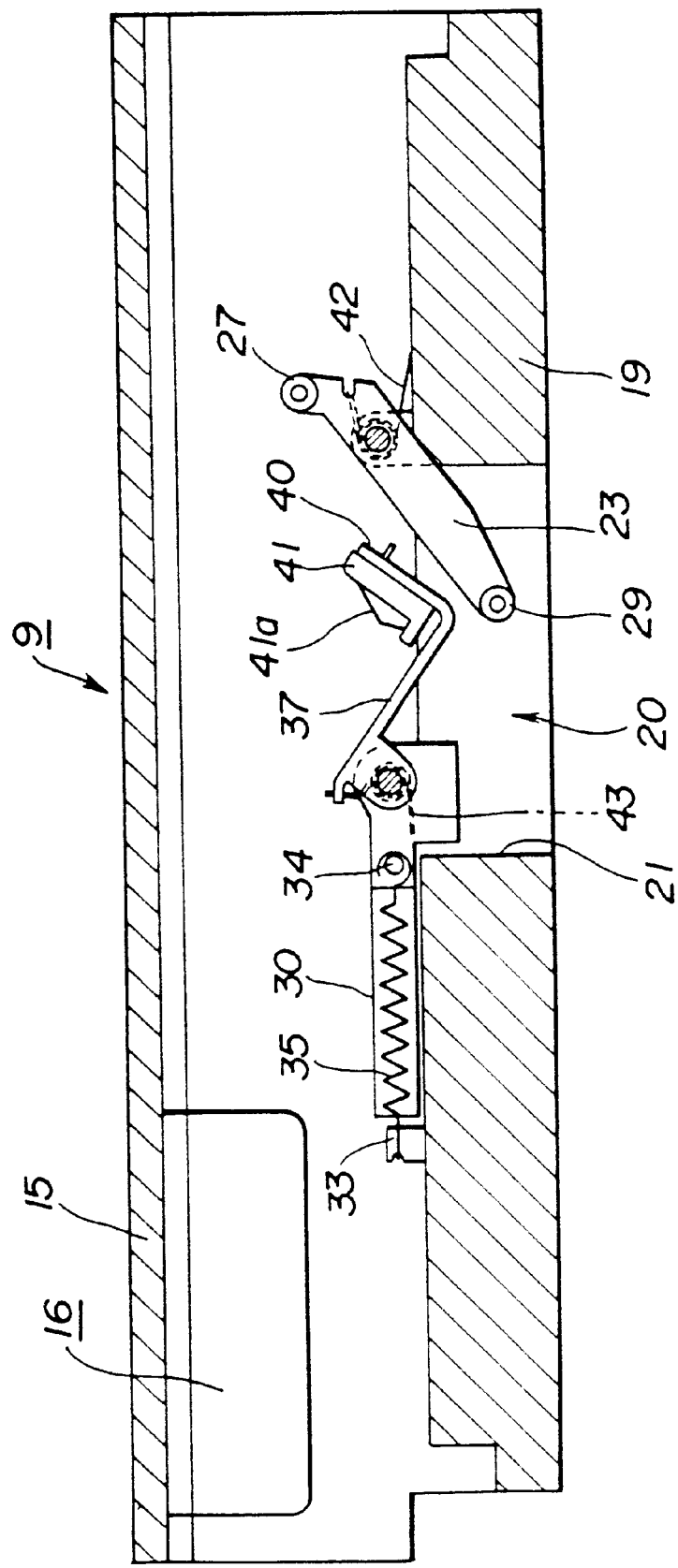
FIG. 5 is a partially cut plan view showing a cassette transfer mechanism.

As shown in FIG. 5, a support wall 19 is, at the right end of the movable base 15, formed to stand erect and face the handling portion 16. The memory storing/reading unit 20 is supported by the support wall 19. The support wall 19 has a cut opening 21 having an inverted L-shape when viewed from the right. Support members 22 projecting to the left are formed in a narrow width portion of the front portion of the cut opening 21.

Figure 6:
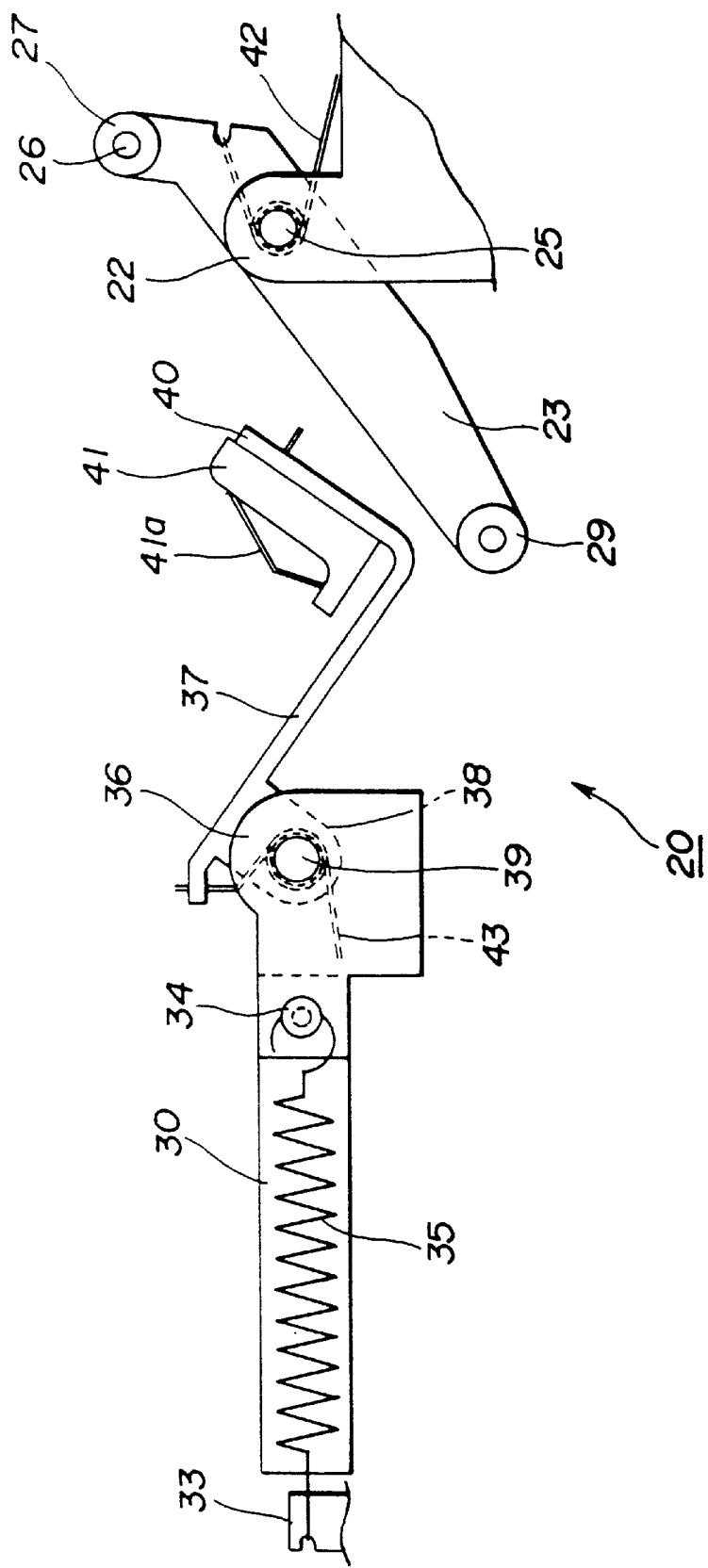
FIG. 6 is a schematic plan view showing a unit for storing/reading the memory included in the cassette.

FIG. 6 shows the overall body of the memory storing/reading unit 20 according to the present invention.

Figure 7:
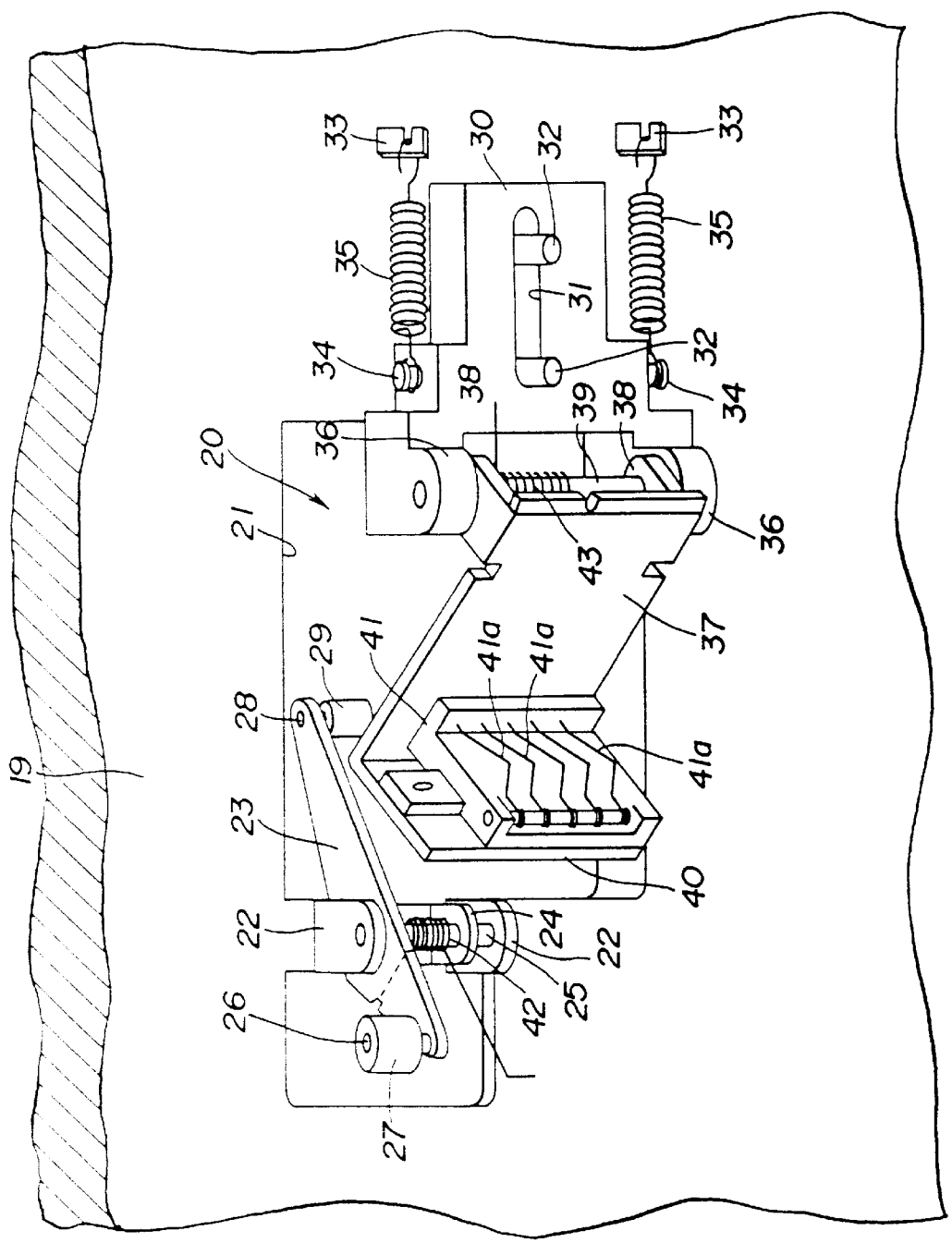
FIG. 7 is a schematic perspective view showing the unit for storing/reading memory included in the cassette.
Figure 8:
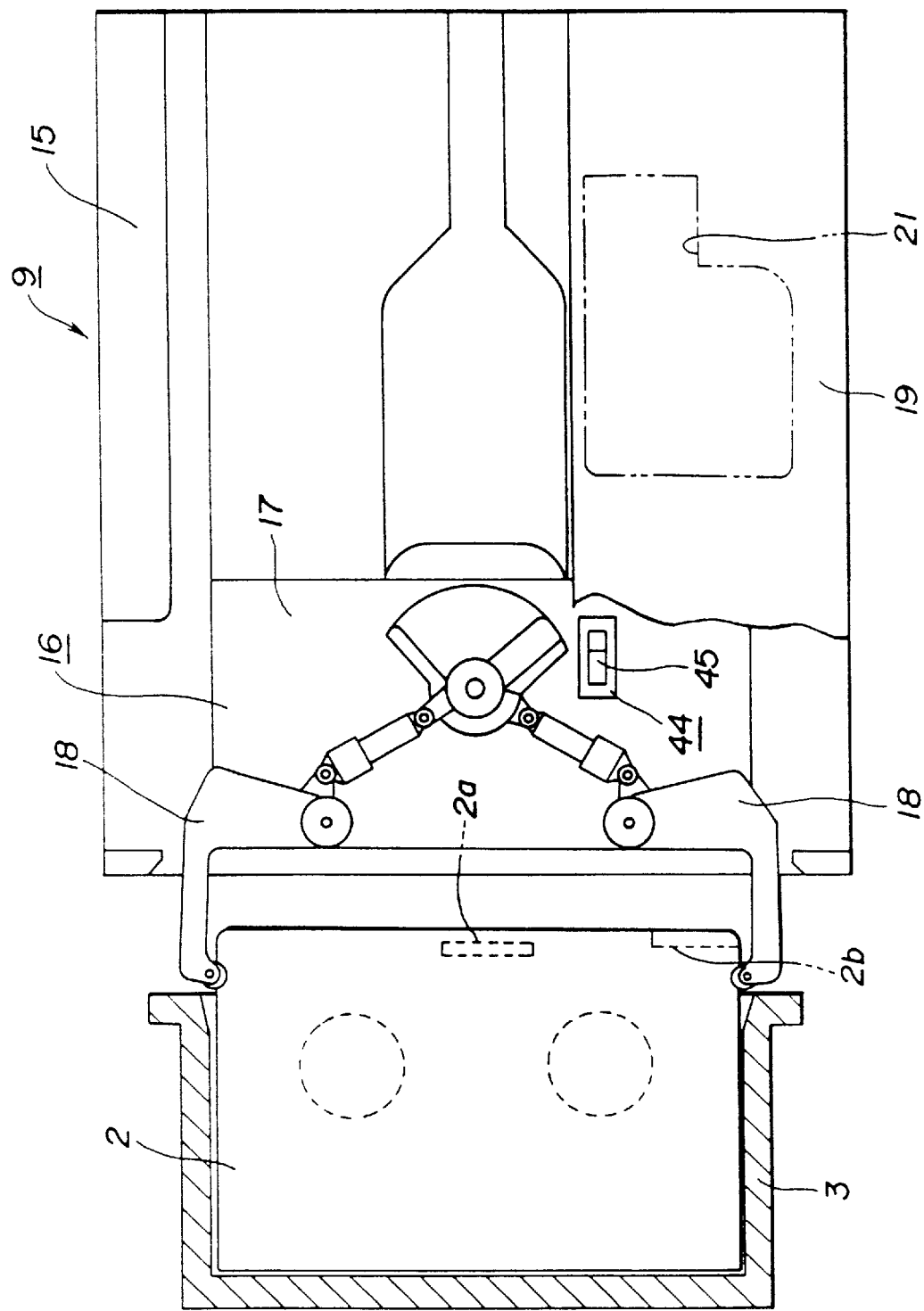
FIG. 8 is a right-hand side view showing the system in a state where a unit for storing/reading a memory included in the cassette is omitted.
Figure 9:
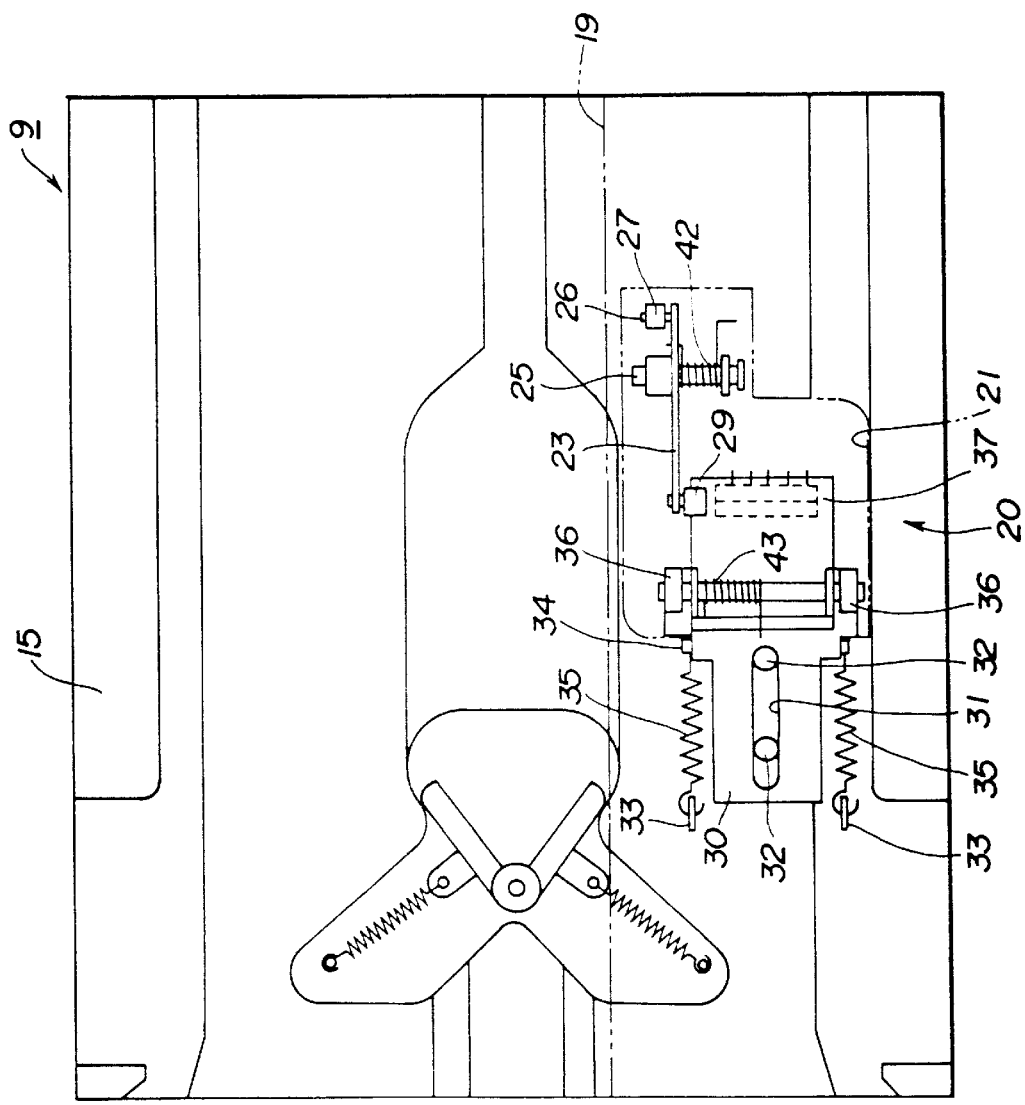
FIG. 9 is a right-hand schematic side view showing the system in a state where the handling portion is omitted.

As shown in FIG. 6, a connector rotating arm 23 is rotatively supported by the support members 22. The connector rotating arm 23 has a plate-like shape elongated in substantially the lengthwise direction. A member 24 to be supported and having an L-like shape when viewed from a rear position is provided for the connector rotating arm 23 at an intermediate position somewhat adjacent to the rearward position (see FIG. 7). A shaft 25 supported between the support members 22 is inserted into the lower portion of the member 24 to be supported and a corresponding portion of the connector rotating arm 23 so that the connector rotating arm 23 is rotatively supported by the support members 22. A shaft 26 is stood erect at the rear end of the connector rotating arm 23. Moreover, a roller 27 to be pressed is rotatively supported by the shaft 26. In addition, a shaft 28 disposed downwards at the front end of the connector rotating arm 23. A pressing roller 29 is rotatively supported by the shaft 28.

A slider 30 is supported by the support wall 19 at the front end of the cut opening 21 in such a manner that the slider 30 is able to slide back and forth. An opening 31 to be guided and elongated back and forth is formed in the slider 30. Two guide shafts 32 projecting over the left side surface of the support wall 19 and formed apart from each other back and forth are slidably inserted into the opening 31 to be guided. As a result, the slider 30 is supported by the support wall 19 slidably back and forth.

Tension coil springs 35, which are spring means, are arranged between spring stoppers 33 projecting over the left side surface of the support wall 19 and spring retaining pins 34 projecting over the slider 30. As a result, the slider 30 is urged forwards. In a state where the slider 30 is not pulled rearwards, the rear guide shafts 32 is in contact with the rear end of the opening 31 to be guided. Moreover, support members 36 projecting to the left are formed at the two vertical ends of the rear ends of the slider 30.

The front end of a connector plate 37 is rotatively supported by the rear end of the slider 30. The connector plate 37 has an L-like shape when viewed from an upper position. A shaft 39 supported between the support members 36 of the slider 30 is inserted into members 38 to be supported, the members 38 being formed to project to the left over the two vertical ends of the front portion of the connector plate 37. As a result, the connector plate 37 has a front end portion which is rotatively supported at the rear end of the slider 30.

A connector 41 is supported at the front surface of a support portion 40 formed at the rear end of the connector plate 37, the support portion 40 being formed to project substantially to the right. The connector 41 has contacts 41a formed by spring wires each having a bent central portion, the contacts 41a being formed to project over the front surface of the connector 41.

The front end of the connector rotating arm 23 is disposed on the left side of the connector plate 37, while the pressing roller 29 is disposed to be opposite to the rear end of the left side surface of the connector plate 37.

A coil spring 42 is interposed between the connector rotating arm 23 and the support wall 19. Thus, the connector rotating arm 23 is supplied with counterclockwise rotating force when viewed in FIG. 6. Also a torsion coil spring 43 is interposed between the connector plate 37 and the slider 30. Thus, the connector plate 37 is supplied with clockwise rotating force when viewed in FIG. 6.

A cam member 44 is supported by the arm base 17. A right side surface 45 of the cam member 44 is formed into a cam surface. The cam surface 45 has a flat portion 45a extending back and forth and an inclined portion 45b formed continuously from the rear end of the flat portion 45a and warped to the left toward the rear position.

Referring to FIGS. 10 to 15, the operation will now be described in which the contacts 41a of the connector 41 of the memory storing/reading unit 20 are brought into contact with the memory terminal 2b of the tape cassette 2.

When information is stored in the nonvolatile memory 2a of the tape cassette 2 and/or read from the same, the handling portion 16 is further moved rearwards from the above-mentioned retracted position (the position shown in FIG. 3) to the position shown in FIG. 4.

Figure 10:
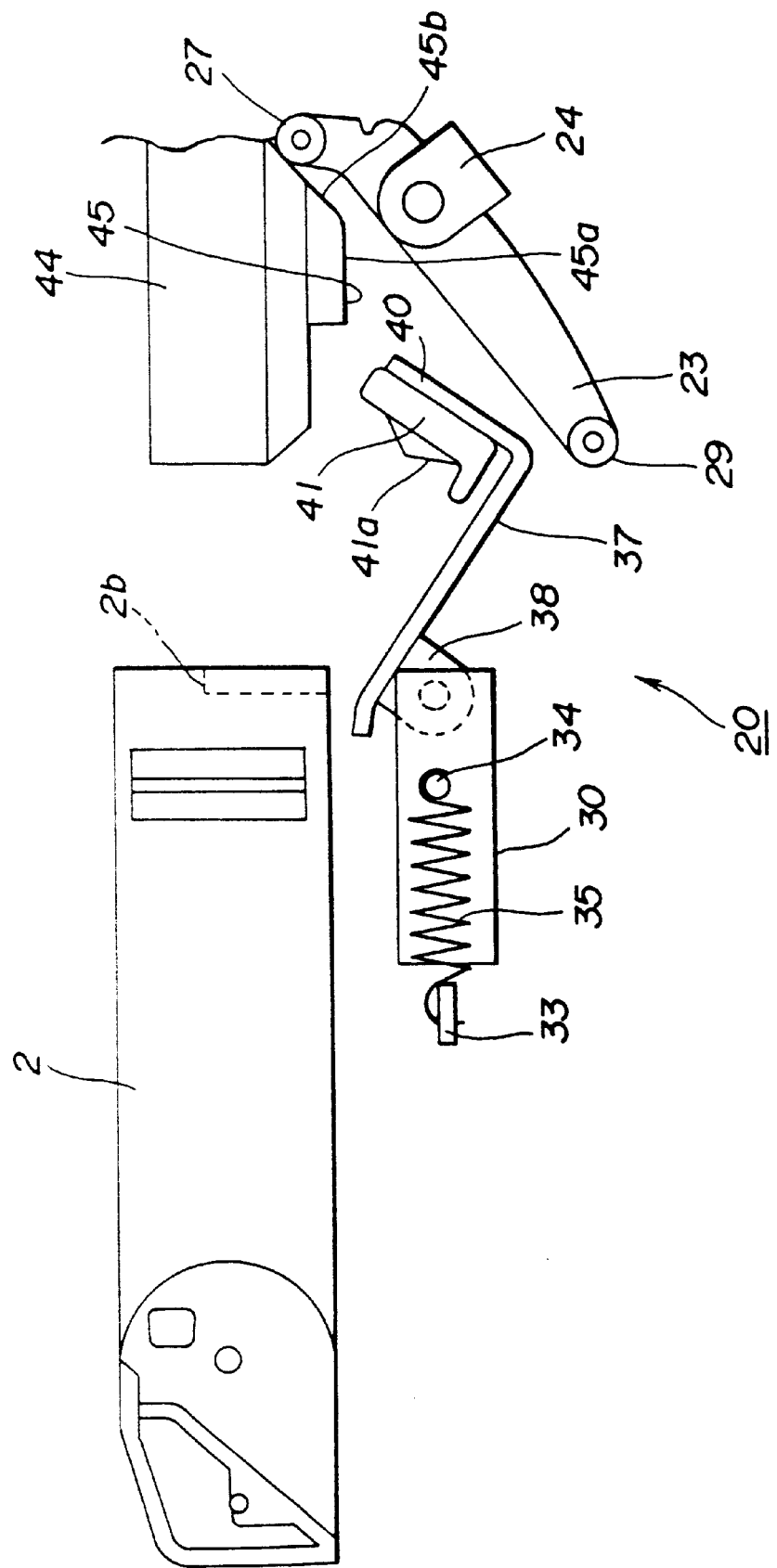
FIG. 10 is a schematic plan view showing a state where a connector comes in contact with a memory terminal of the cassette recording medium in a state where the unit for storing/reading the memory included in the cassette start operating.
Figure 11:
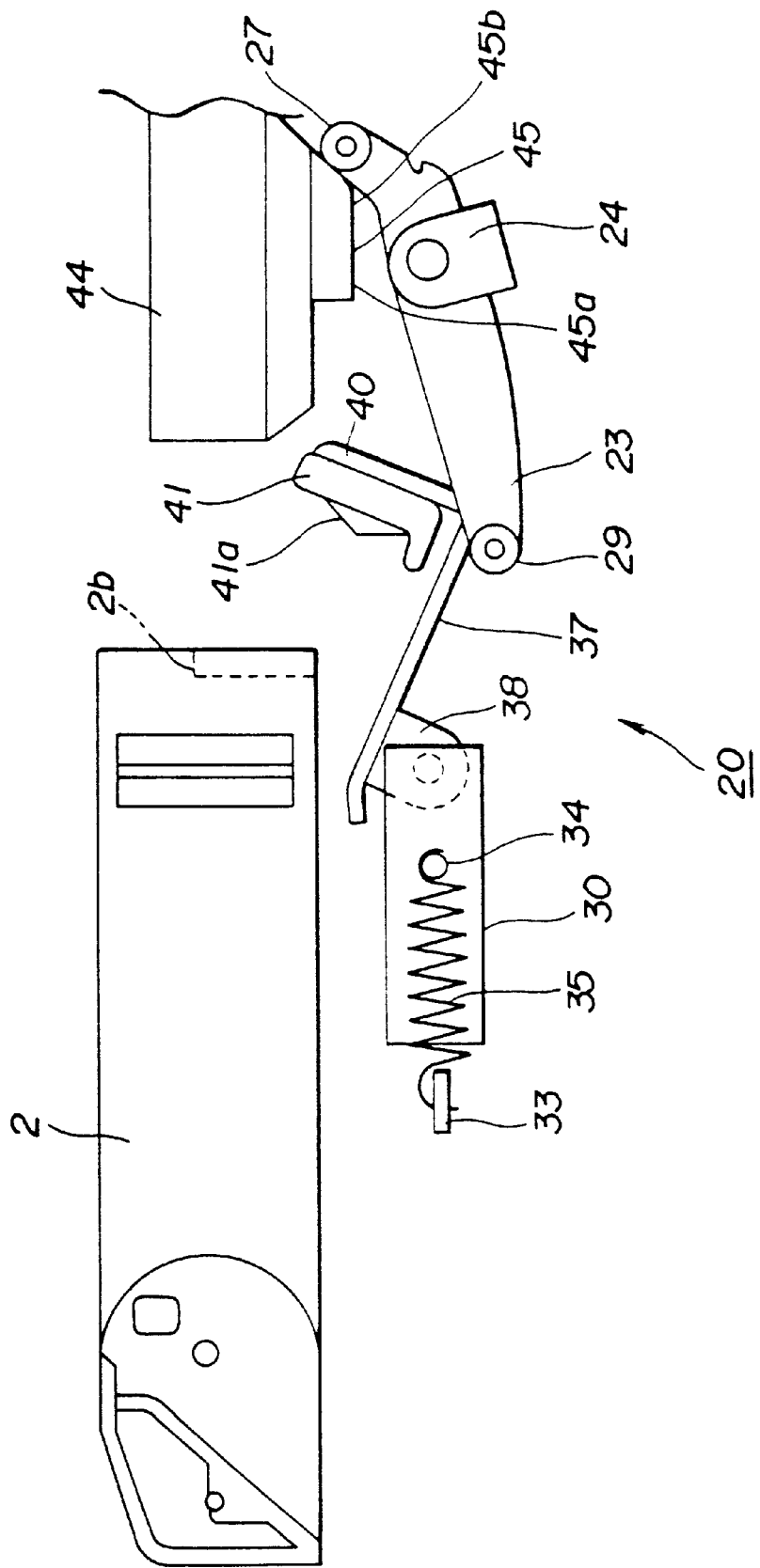
FIG. 11 is a diagram showing a state following the state shown in FIG. 10.
Figure 12:
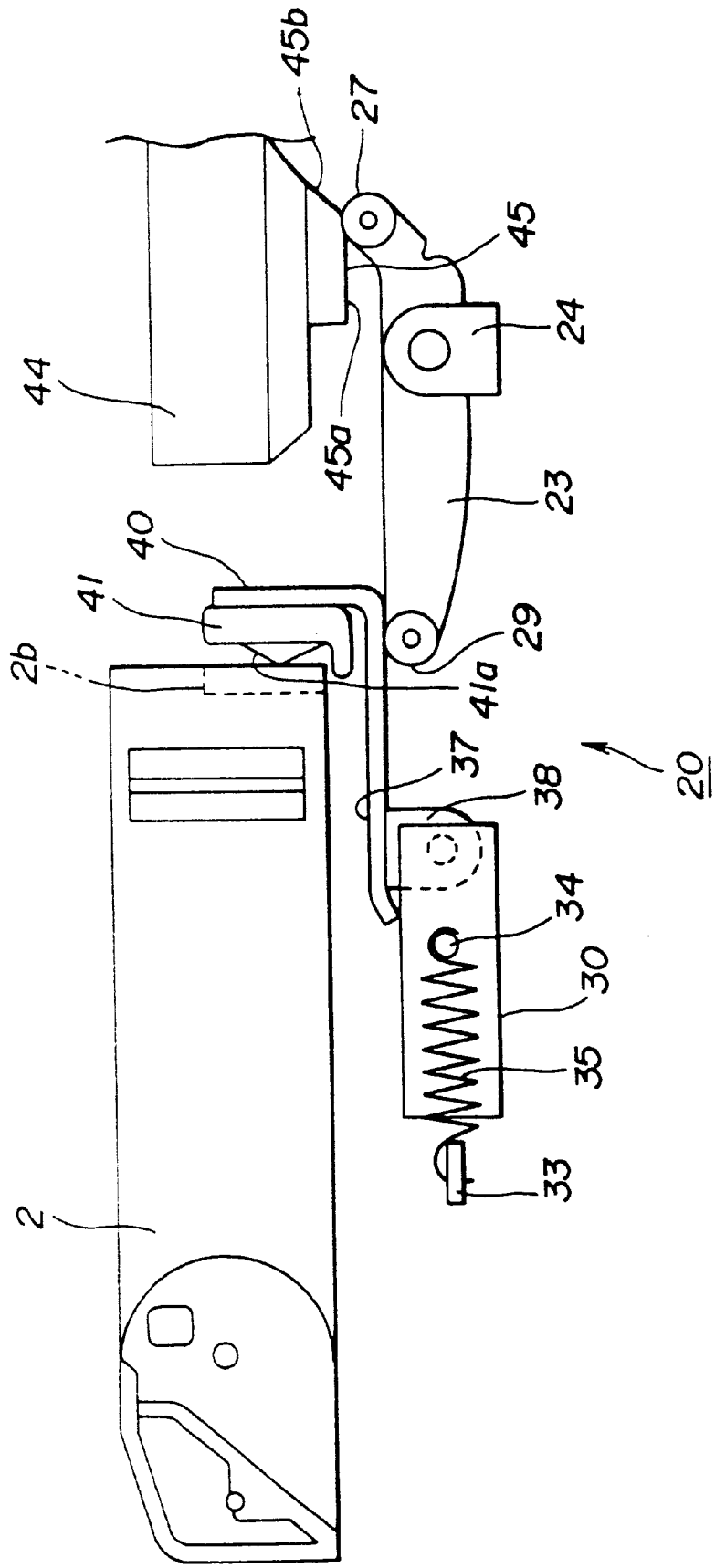
FIG. 12 is a diagram showing a state following the state shown in FIG. 11 in which the connector has approached the memory terminal.

When the handling portion 16 holding the tape cassette 2 has been moved rearwards, contact of the roller 27 of the connector rotating arm 23 with the inclined portion 45b of the cam member 44 supported by the arm base 17 is started (see FIG. 10).

In a period in which the roller 27 to be pressed rolls on the inclined portion 45b relatively in the forward direction, the roller 27 to be pressed is pressed to the right by the inclined portion 45b. Therefore, the connector rotating arm 23 is rotated clockwise when viewed from an upper position in FIG. 10. Thus, the pressing roller 29 presses the connector plate 37 to the left. As a result, the connector plate 37 is counterclockwise rotated when viewed from an upper position (see FIG. 11).

When the roller 27 to be pressed has reached the rear end of the flat portion 45a, the surface of the connector 41 having the contacts 41a is positioned perpendicular to the direction in which the tape cassette 2 is moved. As a result, the contacts 41a of the connector 41 face the memory terminal 2b of the tape cassette 2 (see FIG. 12).

Figure 13:
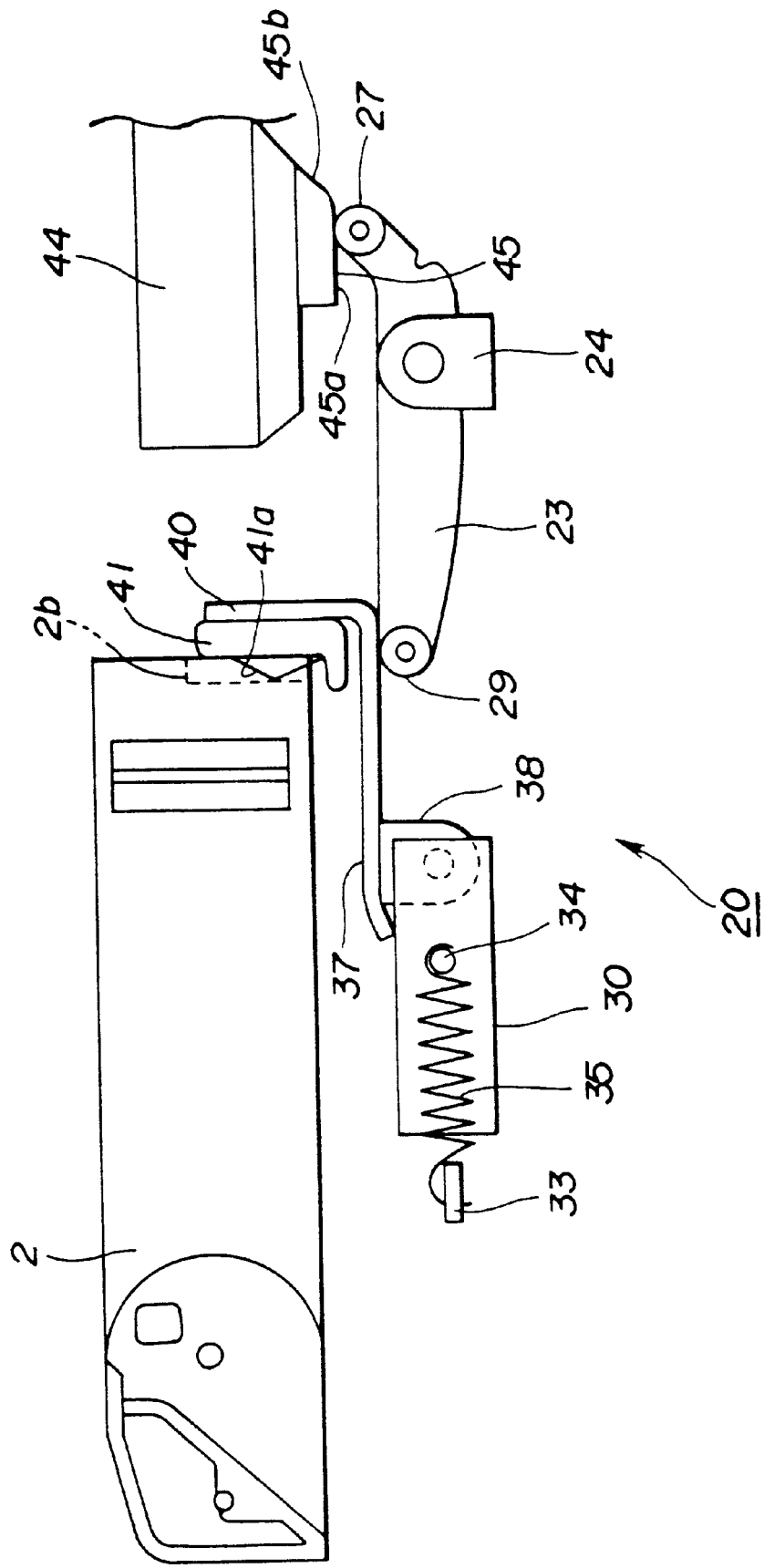
FIG. 13 is a diagram showing a state following the state shown in FIG. 12 in which the connector has been brought into contact with the memory terminal.
Figure 14:
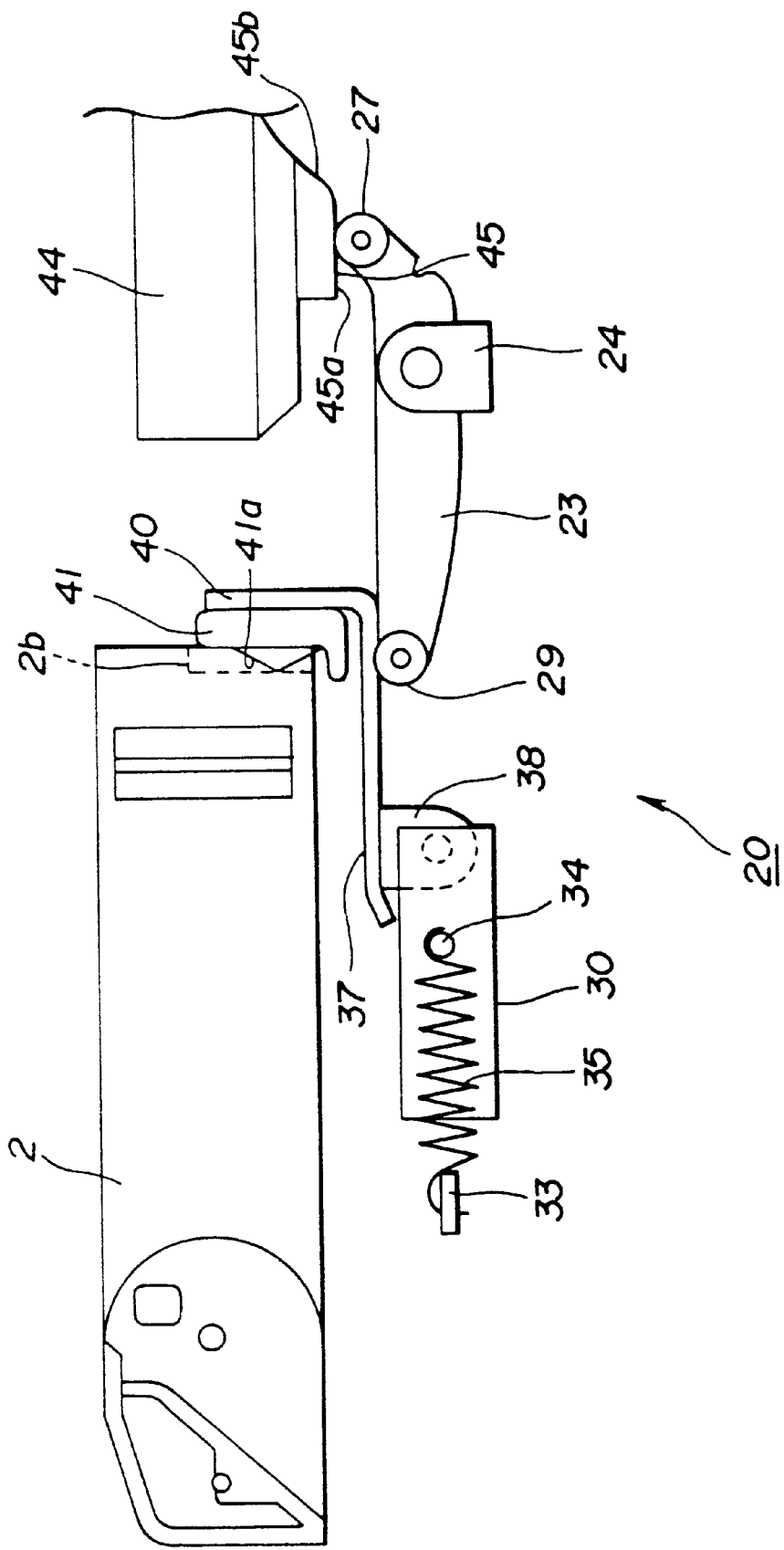
FIG. 14 is a diagram showing a state where the connector has been forcibly pressed against the memory terminal.

When the handling portion 16 has been moved further rearwards, the contacts 41a are deflected and pressed against contacts (not shown) of the memory terminal 2b of the tape cassette 2 (see FIG. 13).

When the handling portion 16 has been further moved rearwards, the connector 41 is rearwards pressed by the rear surface of the tape cassette 2. Therefore, the connector plate 37 is moved rearwards with respect to the support wall 19 in such a manner that the connector plate 37, together with the slider 30, expands the tension coil springs 35 (see FIGS. 14 and 15). As described above, the tension coil springs 35 act as limiters. Moreover, the spring force stored as a result of the expansion causes the contacts 41a of the connector 41 to be strongly pressed against the contacts of the memory terminal 2b of the tape cassette 2. Thus, the contact among the contacts 41a and the contacts of the memory terminal 2b are made to be reliable.

Note that the spring means to serve as the limiters are not limited to the tension coil springs.

Figure 15:
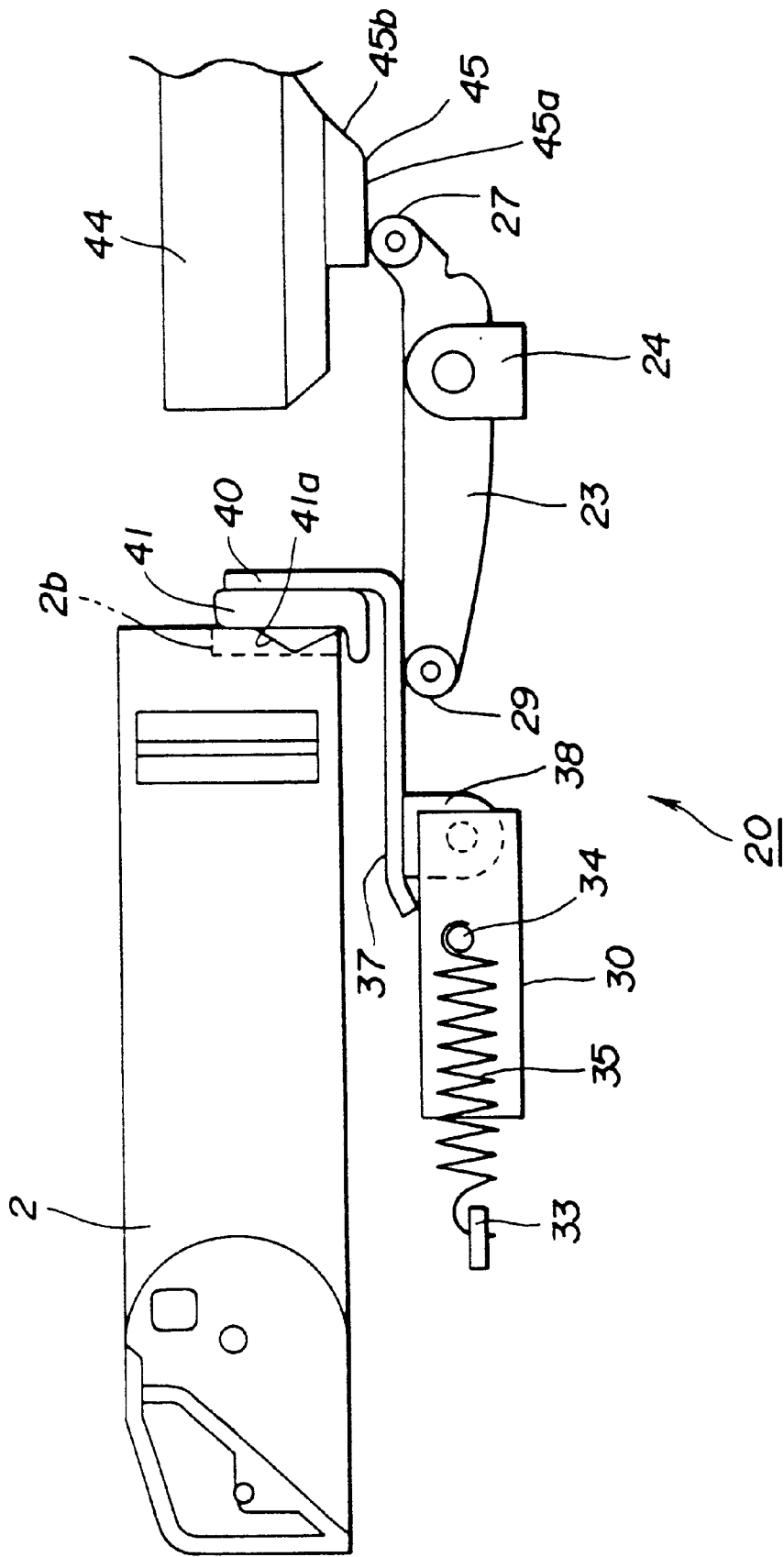
FIG. 15 is a diagram showing a state where the connector has been furthermore pressed against the memory terminal.

Thus, the contacts 41a of the connector 41 and the contacts of the memory terminal 2b of the tape cassette 2 are reliably brought into contact with one another, as shown in FIG. 15. In this state, information is, through the connector 41, stored in the nonvolatile memory 2a of the tape cassette 2 and/or read from the same.

With the above-mentioned cassette transfer mechanism 9, the simple operation of holding the tape cassette 2 and further introducing the same from the predetermined position (see FIG. 3) to a deep position (see FIG. 4) causes the contacts 41a of the connector 41 to be brought into contact with the contacts. Of the memory terminal 2b of the tape cassette 2. Thus, information can be stored in the nonvolatile memory 2a and/or read from the same. Therefore, the necessity of loading the tape cassette 2 into the tape streamer drives 6 can be eliminated when information is stored in the nonvolatile memory 2a of the tape cassette 2 and/or read from the same.

As described above, only when information is stored in the nonvolatile memory 2a and/or read from the same, the tape cassette 2 is introduced into the position shown in FIG. 4 to bring the contacts 41a of the connector 41 into contact with the memory terminal 2b. When the tape cassette 2 is moved, the tape cassette 2 is brought to the position shown in FIG. 3 so that the contacts 41a of the connector 41 and the memory terminal 2b are made to be sufficiently apart from one another. Thus, even if the cassette transfer mechanism 9 gets a shock, conflict of the connector 41 with the tape cassette 2 causing the connector 41 and the tape cassette 2 to be damaged can be prevented.

The embodiment has been described with respect to a structure in which the memory storing/reading unit has the connector and information is stored in the memory and/or read from the same in the state where the connector is in contact with the memory terminal of the cassette recording medium. However, the memory storing/reading unit according to the present invention may be a unit for storing information in the memory and/or reading information from the same in a non-contact manner with the memory contact of the cassette recording medium.

Although the embodiment has been described with respect to a structure in which a cassette transfer mechanism for use in a cassette library system in which the tape cassette 2 is used as the cassette recording medium, the cassette recording medium according to a present invention is not limited to the tape cassette. The present invention may be applied to a cassette transfer mechanism for transferring another type cassette recording medium, such as an optical disk, a magneto-optical disk or the like.

The cassette transfer mechanism according to the present invention is not limited to that for use in a cassette library system. The present invention may widely be applied as a cassette transfer mechanism for use in another apparatus or system.

Although the invention has been described in its preferred form with a certain degree of particularity, the present embodiment is therefore illustrative and not restrictive.

What is claimed is:

1. An apparatus comprising:

an accommodating portion for accommodating a plurality of cassettes each having a memory therein;

a drive unit into which a cassette of said plurality of cassettes is loaded so that an information signal is stored in a recording medium included in said cassette and/or read therefrom; and a transfer mechanism adapted to move between said accommodating portion and said drive unit for transferring said cassette to and from said accommodating portion and said drive unit, wherein said transfer mechanism includes memory access means for one of storing information in said memory included in said cassette and reading information therefrom.

2. The apparatus according to claim 1, wherein said memory access means includes a connector electrically connected to a memory terminal provided in said cassette when information is stored in said memory included in the cassette and information is read therefrom.

3. The apparatus according to claim 2, wherein said memory access means includes spring means for forcibly connecting said connector to said memory terminal after said connector has been brought into contact with said memory terminal.

4. The apparatus according to claim 2, wherein said cassette transfer mechanism further includes:

a handling mechanism adapted to hold said cassette and adapted to move when said cassette is received from one of said accommodating portion and an outside of said apparatus; and an operation mechanism for moving said connector to a position where said connector faces said memory terminal when said handling portion is moved.

5. The apparatus according to claim 4, wherein said handling mechanism holds said cassette at a first position when said cassette is moved between said accommodating portion and said drive unit, and wherein said memory access means stores information in said memory and reads information therefrom at a second position different from said first position.

6. The apparatus according to claim 4, wherein said memory access means includes a first arm provided with said connector at one end thereof, and wherein said operation mechanism includes a second arm adapted to rotate in synchronization with a movement of said handling mechanism and for rotating said first arm so that said connector faces said memory terminal.

* * * * *